United States Patent [19]

Darwood

[11] 4,005,270

[45] Jan. 25, 1977

[54] REMOTE CONTROL FOR OPERATING A TELEPHONE ANSWERING SYSTEM FROM A REMOTE POINT OVER THE TELEPHONE LINE

[75] Inventor: James R. Darwood, Cerritos, Calif.

[73] Assignee: T.A.D. Avanti, Inc., Paramount, Calif.

[22] Filed: May 29, 1975

[21] Appl. No.: 581,842

[52] U.S. Cl. .............................................. 179/6 E
[51] Int. Cl.² ......................................... H04M 1/64
[58] Field of Search .................... 179/6 R, 6 C, 6 E

[56] References Cited
UNITED STATES PATENTS

| | | | |
|---|---|---|---|
| 3,141,931 | 7/1964 | Zarouni | 179/6 C |
| 3,600,517 | 8/1971 | Goodman | 179/6 E |

Primary Examiner—Raymond F. Cardillo, Jr.
Attorney, Agent, or Firm—Keith D. Beecher

[57] ABSTRACT

A solid state telephone answering system is provided which includes replaceable magnetic tape cassettes, one of which contains a recorded announcement to be sent to the calling party when the system first answers the telephone, and a second of which serves to record the message from the calling party. A person may achieve remote control of the system by transmitting a tone of a predetermined frequency over the telephone line for a short time interval. In response to such a tone, the telephone answering system conditions itself to permit the caller to record a new announcement on a loop magnetic tape in the announcement cassette.

4 Claims, 5 Drawing Figures

"T1" REMOTE CONTROL CIRCUIT

REMOTE CONTROL FOR OPERATING A TELEPHONE ANSWERING SYSTEM FROM A REMOTE POINT OVER THE TELEPHONE LINE

The telephone answering system of the invention is the same general type as that described in copending application Ser. No. 548,413, which was filed Feb. 10, 1975, and in copending application Ser. No. 556,649, which was filed Mar. 10, 1975, both in the name of the present inventor.

BACKGROUND OF THE INVENTION

Telephone answering systems in general are well known to the art. Such systems respond to an incoming telephone ring signal to transmit a recorded announcement to a calling party during a first time interval (T-1), and then automatically to enter a message recording mode during a second time interval (T-2) during which a message from the calling party is recorded.

The telephone answering system described in the Copending application Ser. No. 556,649 includes an announcement tape which is activated during the (T-1) announcement interval in response to a telephone call, and which causes the recorded announcement on the announcement tape to be transmitted over the telephone line to the calling party during the (T-1) interval. At the end of the (T-1) announcement interval, the message tape is activated, and it records the message from the calling party during an ensuing time interval (T-2). The telephone answering system described in the copending application Ser. No. 556,649, and the system to be described herein, may be constructed so that the time interval (T-2) may have a predetermined fixed time duration, or so that the time interval (T-2) may continue, within the limits of the system, for as long as the calling party is transmitting his message.

The telephone answering system described in the copending application, Ser. No. 562,975, filed 3/28/75, enables the user of the system to call in from any part of the world, and to activate the system and cause it to transmit to the caller all the accumulated messages on the message tape. As fully described in U.S. Pat. No. 3,757,049, which issued Sept. 4, 1973, and which is assigned to the present Assignee, remote control of the telephone answering system may be achieved by means of a small portable transmitter unit which is held up by the caller to the mouthpiece of a telephone, and which is pushbutton controlled to transmit a tone signal of a predetermined frequency over the telephone line. The telephone answering system described in copending application Ser. No. 562,975 is designed to respond to the particular tone frequency to activate a remote control circuit therein, so that the message tape may be rewound to its origin position, and then set to a playback condition so that the messages on the tape may be successively transmitted over the telephone line to the calling party.

The telephone answering system described in the copending application Ser. No. 562,975 incorporates a simple remote control circuit which responds to a tone signal of a particular frequency received over the telephone line. The control circuit described in the copending application Ser. No. 562,975, in response to the received tone signal, causes the message tape to return to its origin position, and then automatically sets the telephone answering system to its playback mode, so that all the messages on the message tape may be transmitted in sequence to the calling party over the telephone line. The remote control circuit then responds to a second tone signal of the same frequency transmitted over the telephone line by the calling party to terminate the playback operation after the last message has been transmitted and to reset the telephone answering system to its automatic answer operational mode.

The telephone answering system of the present invention includes a remote control system which responds to a tone signal of a different frequency from the above-mentioned tone signal which, likewise, is received over the telephone line from the transmitter operated by the user at a remote point. The control circuit in response to the latter received tone signal, sets the system to a condition in which the announcement tape may receive a new announcement from the remote user. This new announcement is then dicated over the telephone line by the remote user, and it is used for subsequent operations of the system, until again changed by the user.

DETAILED DESCRIPTION OF THE ILLUSTRATED EMBODIMENT

Figure 1:
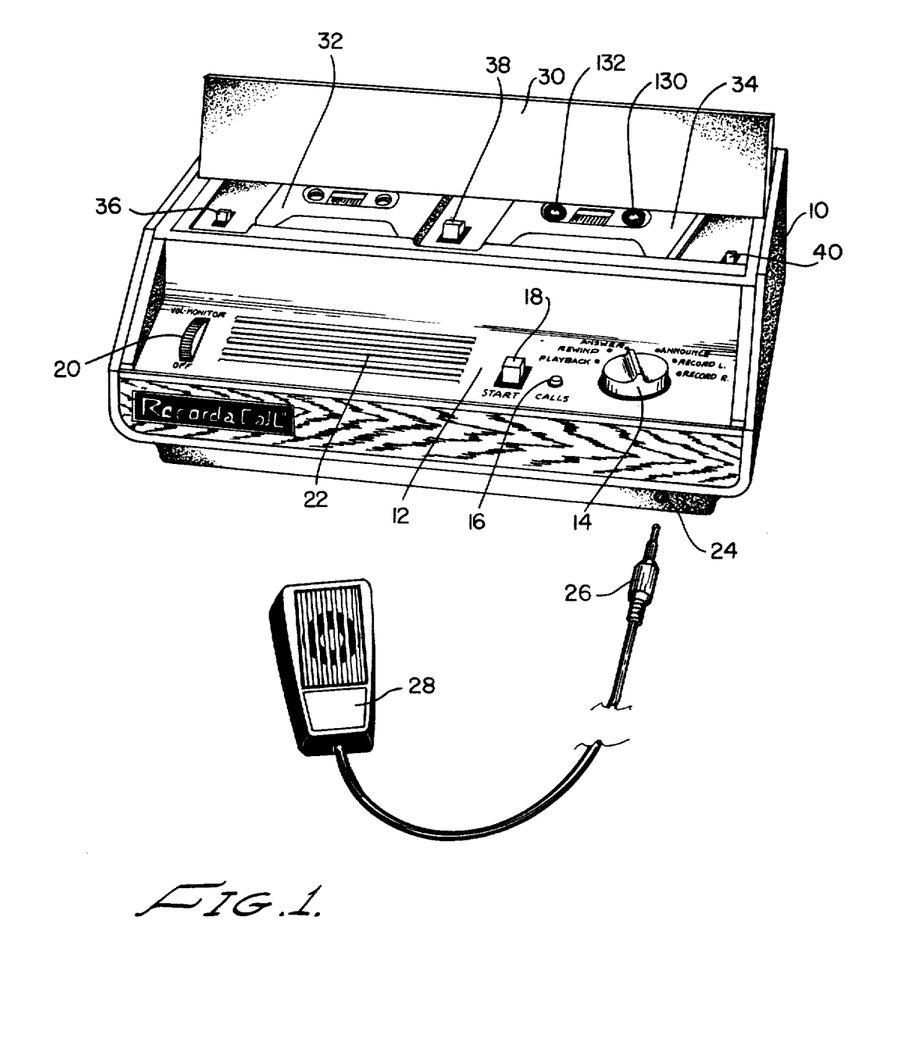
FIG. 1 is a perspective representation of a telephone answering instrument which may incorporate the improved system of the present invention.

The telephone answering instrument shown in FIG. 1 is of the type described in copending application Ser. No. 548,413. It is constructed for direct use in conjunction with the telephone line, and it may be plugged into a usual telephone jack by an appropriate telephone connecting cord or cable. The instrument is energized from the usual domestic alternating current power source, and a typical power cord is also provided for plugging the unit into the domestic power receptacle.

The instrument shown in FIG. 1 includes a casing 10 having a control panel 12 extending along its forward edge. A control knob 14 is rotatably mounted on the control panel 12, and it controls a multi-section rotary switch. The rotary switch may be set to six different positions, indicated respectively as "Playback", "Rewind", "Answer", "Announce", "Record 1" and "Record 2".

A call light 16 is mounted on the control panel 12, and this call light is illuminated whenever a call is received by the instrument. A start button 18 is also mounted on the control panel 12 which, when depressed, operates a switch to place the instrument in operation, just as if a telephone call were received. Also, a combined on-off power switch and volume control 20 is mounted on the control panel 12. The instrument includes a speaker which is mounted behind a grill 22 on panel 12, and it also includes a microphone jack 24 which receives the plug 26 of a microphone 28.

The top of the casing 10 has a hinged lid 30 which may be opened to permit access to a pair of cassette-type tape units designated 32 and 34. The cassette tape unit 32 contains a loop of magnetic tape which bears the recorded announcement which is transmitted to the calling parties during the first time interval T-1 after each call is received, and which announcement may be changed from a remote source by the control circuit of the invention, as will be described. The cassette tape unit 34 contains a reel of magnetic tape which is drawn onto a take-up reel to record the messages from the calling parties which are received during each time interval T-2 following the corresponding announcement interval T-1.

A lever 36 is provided which permits the removal of the announcement cassette 32. An erase lever 38 is provided which, when operated during the rewind mode of the tape in the message cassette 34, serves to erase the previous messages on the tape in the message cassette, as more fully described in copending application Ser. No. 548,413. A fast forward lever 40 is also provided which imparts a fast forward motion to the tape in the message cassette 34, as also described in application Ser. No. 548,413.

When the control knob 14 is turned to the "Answer" position, the telephone answering instrument is then set to answer incoming telephone calls automatically, and to transmit the announcement recorded on the magnetic announcement tape in cassette 32 to a calling party during the time interval T-1, and subsequently to record the message from the calling party on the message tape in cassette 34 during the followiing time interval T-2.

When the control knob 14 is turned to the "Rewind" position, the message tape in cassette 34 is driven in the reverse direction so that it may be rewound to its origin position. When the control knob 14 is turned to the "Playback" position, the message tape in the cassette 34 will move in the forward direction so that the messages previously recorded on the tape may be played and reproduced through a speaker mounted behind the grill 22.

Whenever a telephone call is received by the instrument, the call light 16 is illuminated, so that the operator may turn the control knob 14 to "Rewind" and return the message tape to its origin position, and then he may turn knob 14 to the "Playback" position and play back the messages which have been received and recorded on the message tape. When the control knob 14 is turned to the "Announce" position, the telephone answering instrument will answer the telephone, and it will transmit the announcement on the announcement tape in cassette 32 to the calling parties. However, it will not record any incoming messages.

Any desired announcement may be recorded on the announcement tape in cassette 32 by turning the control knob 14 to the "Record 1" position, by plugging the plug 26 into the microphone jack 24, and by speaking into the microphone 28. Likewise, the instrument may be used as a dictating machine, or for other recording purposes, by setting the control knob 14 to the "Record 2" position, and by recording dictation, or other information on the message tape in cassette 34 through the microphone 28. This latter setting of the control knob 14 also permits the operator to record two-way conversations received over the telephone.

In the following discussion, the outgoing announcement tape will be referred to as the T-1 tape. This tape is in the form of a loop contained in cassette 32 of FIG. 1. The loop contains a short piece of metal foil which comes in contact with the surfaces of switch CS1 in FIG. 2A as the announcement tape rotates, and provides an indication of the origin position of the announcement tape. The incoming message tape, which is contained in the cassette 34 of FIG. 1 will be referred to as the T-2 tape, the cassette 34 being a standard cassette cartridge.

Figure 2A:
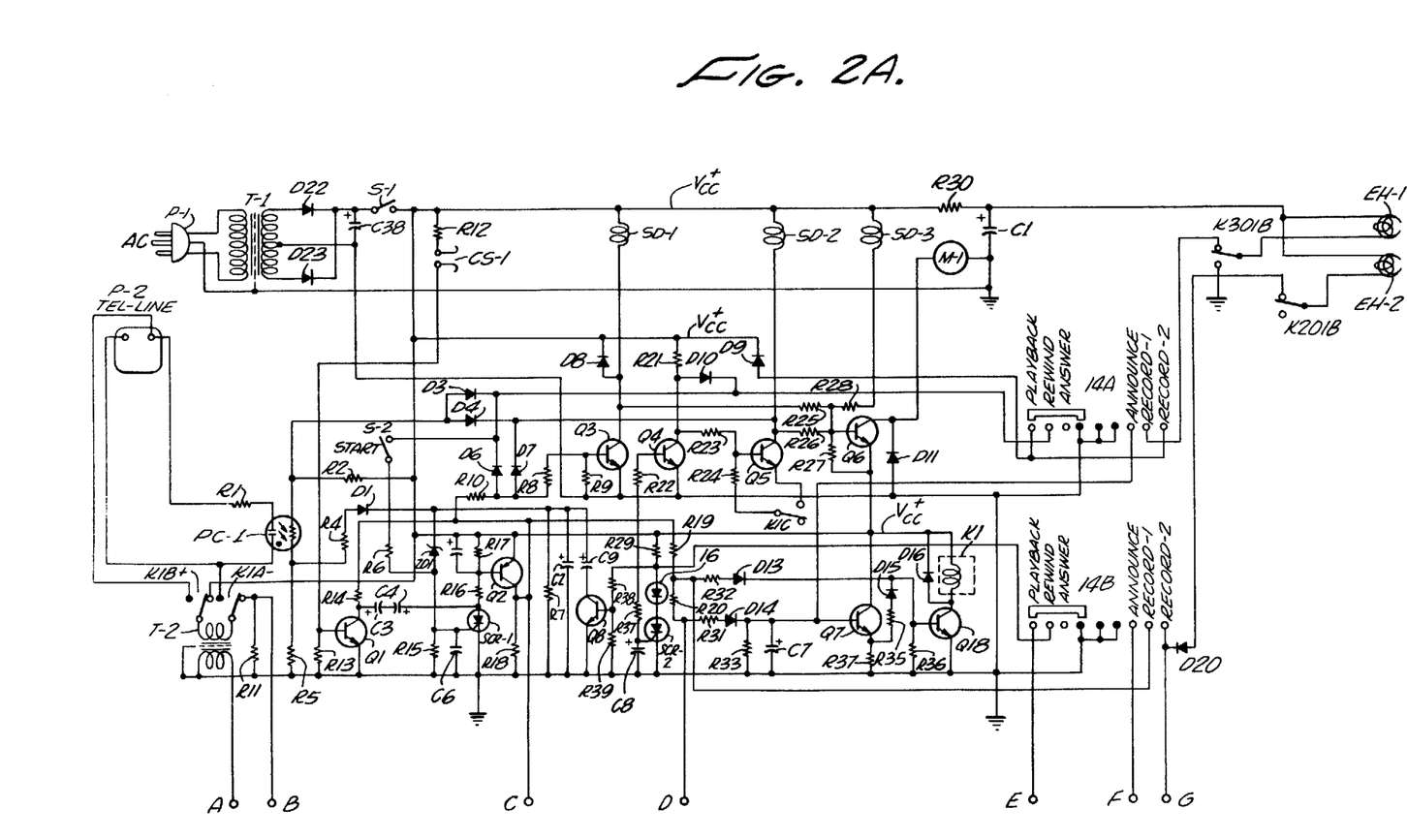
FIGS. 2A and 2B collectively represent a schematic diagram of the electronic portion of the telephone answering system which is described and claimed in copending application Ser. No. 556,649, and which may be incorporated into the instrument of FIG. 1.

During the T-1 announcement mode during which the T-1 announcement tape is operating and transmitting the recorded announcement over the telephone line, a drive motor M-1 is energized, as is a control solenoid SD-1. When the solenoid SD-1 and motor M-1 are energized, the T-1 tape is caused to turn. After one complete loop during the operation of the T-1 tape, the metal foil will contact the switch CS1 to terminate the T-1 announcement mode. The system will be capable of entering the T-1 announcement mode when the control knob 14 is set to its "Answer", "Announce" or "Record 1" positions.

At the end of the T-1 announcement mode, the motor M-1 continues to operate, but the solenoid SD-1 is de-energized and the solenoid SD-2 is energized. This causes the T-1 announcement tape in cassette 32 to stop, and the T-2 message tape in cassette 34 to move in its "forward" mode to record the incoming message. The system is capable of entering the T-2 operational mode when the knob 14 is set to its "Playback", "Answer", or "Record 2" positions. When the control knob 14 is placed in the "Rewind" position, both solenoids SD-1 and SD-2 are de-energized, and a solenoid SD-3 is energized which serves to place the cassette 34 in a high speed rewind mode. This operation is discussed in detail in copending application Ser. No. 548,413.

The power supply is composed of a power cord designated P-1 which is connected to the primary of a power transformer T-1. A pair of diodes D22 and D23 are connected to the secondary of the transformer, and a filter capacitor C38 is connected to the center tap of the secondary and to the cathodes of the two diodes. The capacitor C38 is a 2200 microfarad capacitor, and it constitutes the main filter capacitor for the power supply.

Direct current power is applied to the lead designated $V+_{cc}$ when a power switch S-1 is closed. The power line is connected through a 1.5 kilo-ohm resistor R30 and to a shunting filter capacitor C1 of 100 microfarads to supply ripple-free direct current to a pair of erase heads designated EH-1 and EH-2. The erase head EH-1 is magnetically coupled to the T-1 announcement tape in the cassette 32 of FIG. 1, and the erase head EH-2 is magnetically coupled to the T-2 message tape in the cassette 34, as described in more detail in the copending application Ser. No. 548,413. The power switch S-1 physically is part of the volume control 20 of FIG. 1. As shown in FIG. 2A, the solenoid SD-2 is shunted by a diode D8, and the solenoid SD-2 is shunted by a diode D9.

The usual telephone receptacle is designated P-2, and it connects to the three telephone leads, namely: tip (T), ring (R), and ring ground (RG). In normal configuration the ring ground (RG) is connected to the ring (R) lead. The (RG) lead is connected through a 150 ohm resistor R1 to a neon lamp in a module designated PC-1. The module PC-1 is a lamp/photoresistor module, which may be of the type presently marketed under the designation "Vatec VTL-3B48". The tip lead (T) is connected to the other terminal of the neon lamp.

Resistor R1 insures that the ring detection circuit appears as a high impedance to the telephone line.

When a ring voltage is received over the telephone line, the neon lamp within the module PC-1 is illuminated, causing the photoresistor within the unit to decrease in resistance from approximately 5 megohms to 1 kilo-ohm. This photoresistor is connected through a pair of resistors R3 and R2 to the positive potential lead $V+_{cc}$. Each of these resistors may have a resistance, for example, of 560 ohms. The other terminal of the photoresistor in the module PC-1 is connected to a grounded resistor R5 which may, for example, have a resistance of 5.6 kilo-ohms. During idle conditions the voltage across the resistor R5 is approximately zero. During each ring cycle, however, this voltage increases to approximately 10 volts.

The junction between resistor R5 and the photoresistor in module PC-1 is also connected through an 8.2 kilo-ohm resistor R4 and through a diode D1 to a grounded capacitor C2 of, for example, 100 microfarads, and to a grounded resistor R7 of, for example, 470 kilo-ohms. capacitor C2 is charged during each ring cycle by way of the resistor R4 and diode D1. When the voltage across the capacitor C2 reaches approximately 5 volts, which usually occurs after two ring cycles, a Zener diode ZD1 will conduct, triggering the gate of a silicon controlled rectifier SCR1. The gate of the silicon controlled rectifier is connected to a grounded 10 kilo-ohm resistor R15 which is shunted by a 4.7 microfarad capacitor C6. The firing of the silicon controlled rectifier SCR1, as will be described, initiates the announcement mode T-1, during which the recorded announcement is transmitted over the telephone line to the calling party. The capacitor C2 then discharges during the announcement mode T-1 through the resistor R7.

The circuit includes an NPN transistor Q8 having a grounded emitter, and whose collector is connected to a 47 microfarad capacitor C9 which, in turn, is connected to the capacitor C2. The base of the transistor Q8 is connected to a grounded 1 kilo-ohm resistor R39 and to a 4.7 kilo-ohm resistor R38. The transistor Q8, capacitor C9 and resistors R38 and R39 are used to obtain "automatic ring delay." On the first call after the unit has been turned on or reset, transistor Q8 is conductive, and this places capacitor C9 in parallel with capacitor C2, thus doubling the available ring delay to approximately four ring cycles. However, on all calls after the initial call, until reset, transistor Q8 is non-conductive, thus disabling the additional ring delay, and reducing the ring delay to approximately two ring cycles.

As described in the copending application Ser. No. 556,649, such a control sets the system so that the first call received after the system has been turned on requires a greater number of rings than subsequent calls. This means that the user can turn the system on while he is present, and so long as he answers his calls before the predetermined number of rings, the system will not answer or record the calls. However, if the user so desires, even when present, he can permit the predetermined number of rings to occur for an incoming call, so that the system will answer and record the call. Then, the system automatically sets itself so that for all subsequent calls, it requires a lesser number of rings.

The junction of the resistors R2 and R3 is connected through a diode D3 to the T-2 message tape reverse solenoid SD-3, and through a diode D4 to the message tape solenoid SD-1. These diodes perform interlock functions to assure that the ring detection circuit will not operate during the Playback, Rewind or Record 2 modes, during which time a ground is applied, as will be described to the corresponding terminals of either the solenoid SD-2 or SD-3.

When the proper number of rings have been received, either during the initial stage when both the capacitors C1 and C2 are in the ring detection circuit, or during subsequent calls when only the capacitor C1 is in the ring detection circuit, the silicon controlled rectifier SCR1 is fired to initiate the announcement mode T-1. The gate of the silicon controlled rectifier SCR1 is also connected to the start switch 18 through a 47 ohm resistor R6 so that the announcement mode can also be initiated by closing the start switch. The start switch is also connected to the interlock relay D3 to prevent the system from entering the announcement mode T-1 whenever it has been placed in any of the modes referred to in the preceding paragraph.

The base of silicon controlled rectifier SCR1 is grounded, and the anode is connected through a pair of resistors R16 and R17 to the positive $V+_{cc}$ lead. The resistor R16 may have a resistance of 1 kilo-ohm, and the resistor R17 has a resistance of 330 ohms. The resistor R15 provides thermal stability for the silicon controlled rectifier SCR1, and the capacitor C6 insures that transients will not trigger the silicon controlled rectifier.

The junction of the resistors R16 and R17 is connected to a PNP transistor Q2. The base of the transistor Q2 is connected to the positive lead $V+_{cc}$, and the collector is connected to a grounded 560 ohm resistor R18. The emitter of the transistor Q2 is connected through a 4.7 kilo-ohm resistor R22 to the base of an NPN transistor Q4. The emitter of the transistor Q4 is grounded, and the collector is connected through a 470 ohm resistor R21 to the positive lead $V+_{cc}$. A capacitor C43 is connected to the emitter and base of transistor Q2. The resistor R17 provides thermal stability for the transistor Q2, and the capacitor C43 provides a short 200 millisecond delay in the rendering of the transistor Q2 conductive. The collector of the transistor Q2 is also connected to a PNP transistor Q3 through a 470 ohm resistor R10 and through a 540 ohm resistor R8. The junction of the resistors R10 and R8 is connected to the cathodes of diodes D3 and D4 through respective diodes D8 and D7. The base of the transistor Q3 is connected to a grounded 470 ohm resistor R9, its emitter is grounded, and its collector is connected to the solenoid SD-1.

When the transistor Q2 is rendered conductive, its collector voltage will approach the supply voltage $V+_{cc}$, and this will cause the transistor Q3 to become conductive by way of resistors R8 and R10. The resistor R9 provides thermal stability for the transistor Q3. When the transistor Q3 is rendered conductive, the solenoid SD-1 is energized, and the announcement tape is driven by the motor M-1.

The collector of the transistor Q3 is also connected to the base of a PNP transistor Q6 through a 470 ohm resistor R25. The emitter of the transistor Q6 is connected to the positive lead $V+_{cc}$, and the base is connected to the emitter through a 330 ohm resistor R27. The collector of the transistor is connected to one terminal of the motor M-1, the other terminal of which is grounded. The motor is shunted by a diode D11. When the transistor Q3 is rendered conductive to energize the solenoid SD-1, the transistor Q6 is also rendered conductive by way of the resistor R25 to cause the motor M-1 to operate, and the T-1 announcement tape to begin to turn.

The switch CS1 is connected to a grounded 10 kiloohm resistor R13 and to a 1 kilo-ohm resistor R12. The latter resistor is connected to the positive terminal $V+_{cc}$. The resistor R13 is connected to the base of an NPN transistor Q1, whose emitter is grounded. The collector of the transistor Q1 is connected through a 470 kilo-ohm resistor R14 to the resistor R10. The collector is also connected to a 10 microfarad coupling capacitor C3 which, in turn, is connected to a 10 microfarad coupling capacitor C4. The latter capacitor is connected to the anode of the silicon controlled rectifier SCR1.

When the T-1 announcement tape turns to a point where its metal foil no longer contacts the switch CS1 which occurs in approximately half a second, the transistor Q1 is rendered non-conductive, and the capacitors C3 and C4 now begin to charge by way of the resistor R14. This charging time takes about five seconds. At the end of the T-1 announcement cycle, the metal foil on the T-1 announcement tape will again contact the switch CS1, which will cause the transistor Q1 quickly to be rendered conductive. When that occurs, the charged capacitors C3 and C4 drive the anode of the silicon controlled rectifiers SCR1 below ground potential, thus permitting the silicon controlled rectifier to be rendered non-conductive. When the silicon controlled rectifier SCR1 is rendered non-conductive, the transistor Q2 is rendered non-conductive, as is the transistor Q3, thereby causing the solenoid SD-1 to be de-energized, so as to stop the T-1 announcement tape.

When the transistor Q2 is rendered conductive at the beginning of the T-1 announcement mode, it also rendered the transistor Q4 conductive by way of the resistor R22. The transistor Q4 is connected to the base of a NPN transistor Q5 through a 560 ohm resistor R23, and through a diode D10 to the cathode of the interlock diode D3. The base of transistor Q5 is also connected to a 1 kilo-ohm grounded resistor R24. The collector of the transistor Q5 is connected to the solenoid SD-2, and through a 470 ohm resistor R26 to the transistor Q6. The emitter of the transistor Q5 is connected through a pair of normally open contacts K1C to ground, these contacts being closed during the T-1 announcement mode. The conductivity of the transistor Q4 during the T-1 announcement mode inhibits the operation of the transistor Q5, thus insuring that the solenoid SD-2 cannot be activated during the T-1 mode, so that there is no possibility of movement of the T-2 message tape during the announcement mode.

The collector of the transistor Q2 is also connected through a 470 ohm resistor R19, through a 2.2 kiloohm resistor R32, and through a diode D13 to the base of an NPN transistor Q18. The base of the transistor Q18 is connected to a grounded 4.7 kilo-ohm resistor R36, the emitter of the transistor is grounded, and its collector is connected to the coil of a relay K1, whose other terminal is connected to the positive lead $V+_{cc}$. The coil of the relay K1 is shunted by a diode D16.

During the T-1 announcement mode when the transistor Q2 is rendered conductive, the transistor Q18 is also rendered conductive to energize the relay K1. The diode D13, and a further diode D15 form a gate circuit, so that the transistor Q18 will be held conductive during the announcement mode when the transistor Q2 is conductive, or whenever the timer circuit of the transistor Q7 and capacitor C7 is charged and operating. The capacitor C7 has a capacity, for example, of 220 microfarads. It is connected to ground, and through a diode D14 to a 1 kilo-ohm resistor R31. The capacitor is also connected to a grounded 100 kilo-ohm resistor R33. The collector of the transistor Q7 is connected to the positive terminal $V+_{cc}$, and the emitter is connected to a grounded 4.7 kilo-ohm resistor R34. The emitter is also connected through a 4.7 kilo-ohm resistor R35 to the diode D15.

The junction of resistors R10 and R14 is connected through the resistor R19 to the resistor R32, and through a 330 ohm resistor R20 to the resistor R31. This connection causes the capacitor C7 to be charged during the T-1 announcement mode by way of the resistor R31 and diode D14. When the capacitor C7 is charged, the transistor Q7 is rendered conductive, and its emitter voltage is used to render the transistor Q18 conductive by way of the resistors R35 and diode D15, to energize the relay K1. The resistor R33 in conjunction with the capacitor C7 determines the length of time the relay K1 will remain energized after the termination of the announcement mode. The diode D16 connected across the coil of relay K1 suppresses transients and protects the transistor Q18.

Therefore, when the ring signal appears across the (RG) and (T) terminals, the module PC-1 is activated to render the transistor Q2 conductive, which, in turn, renders the transistors Q3 and Q6 conductive, as described above to energize the motor M-1 and the solenoid SD-1. The T-1 announcement tape now starts to move, so that the switch CS1 opens, and the transistor Q1 becomes non-conductive. The transistor Q8 then becomes conductive energizing the relay K1. When the relay K1 is energized, the relay contacts K1A and K1B close across the (T) and (R) terminals, connecting the transformer T2 to the telephone line. This permits the recorded announcement from the T-1 tape to be transmitted over the telephone line to the calling party.

At the end of the T-1 announcement interval, the system enters its T-2 message recording mode, during which the T-2 message tape is activated to record incoming messages. This occurs whenever a ground is placed on the lower terminal of the solenoid SD-2 which, at the same time, causes the transistor Q6 to become conductive to energize the motor M-1. As fully described in the copending application Ser. No. 548,413 the motor M-1 drives both the T-1 announcement tape and the T-2 message tape capstans, and the individual tape drive mechanisms are selectively activated by energizing the solenoids SD-1 or SD-2. As mentioned above, for rewind of the message tape T-2, the solenoid SD-3 is energized.

The selector knob 14 of FIG. 1 controls four individual switch sections 14A, 14B, 14C and 14D. When the selector knob is placed in either the Playback (P) or Record 2 (R-2) position, the switch section 14A places a ground on the lower terminal of the solenoid SD-2 to cause the solenoid SD-2 and the motor M-1 to be energized, which is desired during the Playback and Record 2 operations.

The lower terminal of the solenoid SD-2 is also grounded by way of relay contacts K1C and transistor Q5. The transistor Q5 is normally held in its conductive state by way of base current from the resistors R21 and R23. The resistor R24 provides thermal stability for the transistor Q5. The conductivity of the transistor Q5 is inhibited during the T-1 announcement mode by the transistor Q4, as described above; and its conductivity is inhibited during the rewind mode by the diode D10, this being achieved when the switch section 14A is moved to the Rewind position (R) which places a ground on the cathode of the diode D10 thereby clamping the junction of the resistors R21 and R23 to 0.6-volts or less. This clamping voltage holds the base voltage of the transistor Q5 at a level below that necessary to cause the transistor to become conductive. Therefore, the circuitry described above assures that the solenoid SD-2 will be energized, together with the motor M-1, to move the T-2 message tape whenever the relay K1 is energized, except during the T-1 announcement mode or resind mode.

One side of the motor M-1 is grounded directly to the chassis to insure minimum brush noise being introduced into the audio circuits of the system. As described in the copending application Ser. No. 548,413 the motor M-1 is driven in one direction, so that there is no need to switch its ground connection to the chassis. The diode D11 is a transient suppressor for the motor M-1, which protects the transistor Q6, as mentioned above. The transistor Q6 is in series with the motor M-1 to switch the positive power supply lead $V+_{cc}$ to the motor terminal. The resistor R27 provides thermal stability for the transistor Q6. The resistors R25, R26 and R28 form an "or" gate by which the transistor Q6 may be turned on during various operational modes, as described above. These resistors are connected to the ground terminals of the solenoids SD-1, SD-2 and SD-3, so that if any of these solenoids is energized, the motor M-1 will operate simultaneously.

The call light 16 is a light emitting diode in the circuit of FIG. 2A, and it is connected to the anode of a silicon controlled rectifier SCR2, and through a 560 ohm resistor R29 to the lead $V+_{cc}$. The cathode of the silicon controlled rectifier SCR2 is grounded, and its gate is connected to a 4.7 kilo-ohm resistor R37 and to a 47 microfarad capacitor C8. When the system is initially turned on, or is reset, the silicon controlled rectifier SCR2 is in its non-conductive state, and the indicator light 16 is extinguished. Upon the first operation of the T-1 announcement mode, representing the first call received over the telephone line, the silicon controlled rectifier SCR2 is triggered by way of the resistor R37, so that the call light 16 is illuminated to indicate to the user that a call has been received. The capacitor C8 is provided to prevent transient operation of the silicon controlled rectifier SCR2, and the resistor R29 provides a current limit for the call light 16. The call light is extinguished by either removing power by turning off the switch S-1, or by moving the switch section 14D to the rewind position. Either of these operations places a ground short circuit on the positive side of the call light 16, thereby removing current from the silicon controlled rectifier SCR2 and allowing it to turn off.

The circuit of call light 16 also controls the automatic ring delay transistor Q8. When the call light 16 is extinguished, indicating that no calls have been received, the transistor Q8 is rendered conductive, so that both the capacitors C1 and C2 are placed in the ring delay circuit. When the call light 16 is illuminated, however, indicating that the first call has been received, the base voltage of the transistor Q8 becomes low, due to the voltage divider action of the resistors R38 and R39, so that the transistor becomes non-conductive, removing the capacitor C2 from the ring delay circuit.

The rewind operation for the message tape is effectuated, as described above, when the rewind solenoid SD-3 is energized, with the motor M-1 being energized in the same direction as for the T-1 and T-2 operating modes. This occurs when a ground is placed on the lower terminal of the solenoid coil SD-3, which is connected to the base of transistor Q6 through a 470 ohm resistor R28. A ground is placed on the lower terminal of the solenoid SD-3 when the switch section 14A is moved to the rewind position (R). This also causes the transistor Q6 to become conductive so that the motor M-1 is simultaneously energized, and the T-2 message tape is driven in the reverse direction.

Figure 2B:
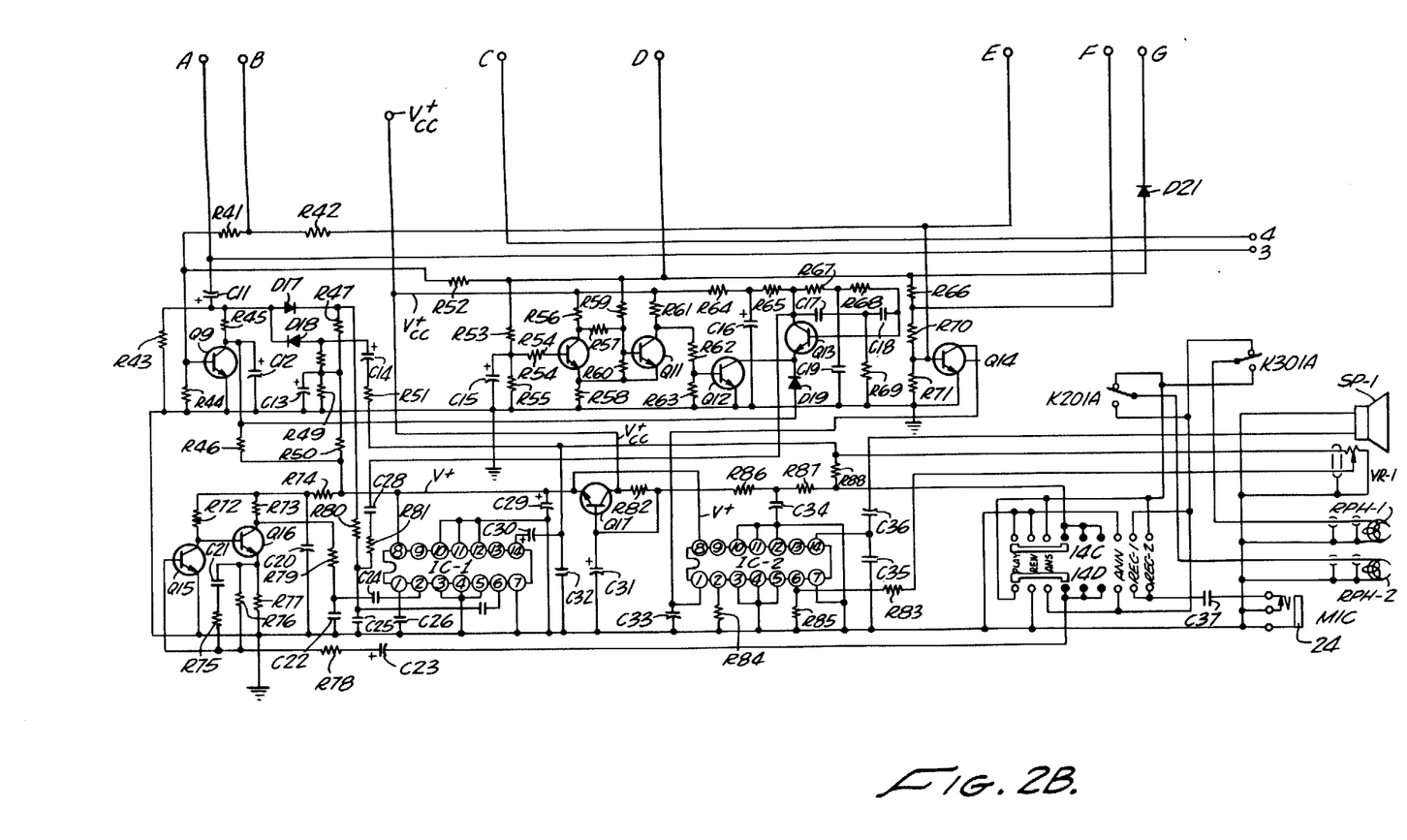

An audio pre-amplifier stage is provided, which is composed of the circuit of a pair of NPN transistors Q15 and Q16. The emitter of the transistor Q15 is grounded, and its collector is connected to a supply voltage lead V+ through a 33 kilo-ohm resistor R72 and through a 10 kilo-ohm resistor R74. The junction of resistors R72 and R74 is connected to a 100 microfarad grounded capacitor C20. The collector of transistor Q15 is connected to the base of transistor Q16. The collector of transistor Q16 is connected to resistor R74 through a 22 kilo-ohm resistor R73. The emitter of transistor Q16 is connected to a grounded 5.5 kil-ohm resistor R77.

The base of transistor Q13 is connected to a 1 kilo-ohm resistor R78 which is coupled through a 10 microfarad coupling capacitor C23 to the common terminal of switch section 14D. The emitter of transistor Q16 is connected to a 223 microfarad capacitor C21 which, in turn, is connected to resistor R78 through a 15 kilo-ohm resistor R75. The capacitor C21 and resistor R75 are shunted by a 100 kilo-ohm resistor R76. The collector of transistor Q16 is connected to a 10 kilo-ohm resister R79 which, in turn, is connected to a grounded 152 microfarad capacitor C22 and to a 103 microfarad capacitor C24.

The input signal to the audio pre-amplifier is selected by the switch section 14D, and it is fed to the base of the transistor Q15 by way of the coupling capacitor C23 and resistor R78. Supply voltage to the audio pre-amplifier is filtered by the resistor R74 and capacitor C20. The collector of transistor Q15 is directly coupled to the base of transistor Q16. The resistor R76 from the emitter of transistor Q16 to the base of transistor Q15 completes the direct current closed loop, providing a stable operating point. The resistor R75 and capacitor C21 form a negative feedback circuit which provides the correct audio shaping for playback from either the T-1 or T-2 tape. The r4esstor R77 provides direct current stability, as well as alternating current negative feedback, to stabilize the gain of the audio pre-amplifier. The resistor R79 and capacitor C22 at the output of the audio pre-amplifier provide a low-pass filter to prevent high frequency oscillation.

The microphone jack 24 is connected to the R1 and R2 terminals of switch section 14D through a 334 microfarad capacitor C37. This capacitor is connected in series with the input impedance of the amplifier during the R1 or R2 recordings by the microphone 28. the resistance/capacitance network formed by capacitor C37 and the input impedance of the pre-amplifier, which is approximately 1500 ohms, exactly complement the negative feedback provided by the resistor R75 and capacitor C21, so that the audio response of the pre-amplifier is flat when recordings are made by the microphone 28 during either the Record 1 or Record 2 operation.

The basic audio amplifier is composed of an integrated circuit IC-1, and its associated components. The coupling capacitor C24 is connected to pin 2 of the integrated circuit. Pin 1 is connected to a grounded 10 microfarad capacitor C26. Pins 3, 4 and 5 are grounded. Pin 6 is connected to a 103 microfarad capacitor C27 which, in turn, is connected to a grounded 222 micro-farad capacitor C25. Pin 7 is grounded, as are pins 10, 11 and 12. Pins 9 and 13 are open. Pin 14 is connected to the positive supply voltage lead V+. The output pin 8 of the integrated circuit IC-1 is connected through a coupling capacitor C30 of, for example, 10 microfarads to a grounded volume control potentiometer VR-1, the potentiometer being shunted by a 104 microfarad capacitor C32.

The output of the audio pre-amplifier is fed to input pin 2 of the audio amplifier intergrated circuit IC-1, and two further isolated inputs are provided to the circuit by way of pins 1 and 6. The audio amplifier pin 2 receives its input from a beep tone oscillator, formed by the circuit of a transistor Q13, by way of a 220 kilo-ohm resistor R81 and a 103 microfarad coupling capacitor C28. The audio amplifier input pin 2 also receives an input from the telephone line by way of a 4.7 kilo-ohm resistor R80 which is connected through a diode D17 to a 10 microfarad coupling capacitor C11 which, in turn, is connected to transformer T2. The resistor R80 and capacitor C25 also form a low-pass filter to prevent high frequency oscillation in the audio amplifier. The capacitor C26 provides improved low frequency response and hum reduction for the integrated circuit IC-1.

The filtered supply voltage V+ is fed to the integrated circuit IC-1 by way of pin 18, and the audio amplifier output is taken from pin 8 of IC-1 by way of capacitor C30. The output is fed through capacitor C30 to the telephone line by way of a 1.5 kilo-ohm resistor R51 which is connected to a 10 microfarad capacitor C14. The capacitor C14, in turn, is connected to the coupling capacitor C11 through diode D18. Accordingly, the diode D17 passes the incoming audio signals from the telephone line to the audio amplifier of integrated circuit IC-1 during the T-2 message recording mode, whereas the diode D18 feeds the output signals from the audio amplifier to the telephone line during the T-1 announcement mode.

The output from the audio amplifier of integrated circuit IC-1 is also fed through a 22 kilo-ohm resistor R88 to the common terminal of switch section 14C, so that it may be fed to the record/reproduce heads RPH-1, RPH-2, which are respectively associated with the T-1 announcement tape and T-2 message tape respectively, when the selector knob 14 is turned to the R-1 or R-2 positions.

Supply voltage for the entire audio section is utilized by use of a capacitor multiplier circuit associated with NPN transistor Q17, in conjunction with capacitor C31. The emitter of transistor Q17 is connected to the voltage lead V+. Its collector is directly connected to the lead V+$_{cc}$ and through a 560 ohm resistor R82 to its base. The emitter is connected through a grounded 10 microfarad capacitor C29. The base of the transistor Q17 is supplied with a filtered current through the circuit of resistor R82 and capacitor C31. The ripple current at the emitter output of the transistor Q17 is proportional to the degree of filtering provided at its base. The resistor R82 is connected through a 10 kilo-ohm resistor R86 and a 30 kilo-ohm resistor R87 to the common terminal of the switch section 14C, the junction between the resistors being connected to a grounded 22 microfarad capacitor C34.

The circuit includes a speaker designated SP, which is mounted behind the grill 22 of the unit of FIG. 1. An integrated circuit designated IC-2, and its associated components, constitute a further audio amplifier for the speaker. The movable arm of the volume control potentiometer VR-1 is connected through a 22 kilo-ohm resistor R83 to pin 6 of the integrated circuit IC-2. Pin 1 is connected to a grounded 4.7 microfarad capacitor C33, pin 2 is connected to a grounded 1 kilo-ohm resistor R84, pins 3, 4 and 5 are directly grounded, pin 6 is also connected to a grounded 1 kilo-ohm resistor R88, pins 7, 10, 11 and 12 are also grounded, pin 8 is connected to a coupling capacitor C36 having a capacitance of 220 microfarads, and which is connected to one terminal of the speaker SP, the other terminal of the speaker being grounded. The terminal 8 is connected to a grounded 224 microfarad capacitor C33, terminals 9 and 13 are open, and terminal 14 is connected to the power lead V+.

Both input pins 2 and 6 of the integrated circuit IC-2 are grounded through equal resistors R84 and R85 to insure that the direct current output from pin 8 will remain at approximately one-half the supply voltage. Input to the amplifier is taken from the volume control VR-1. The resistors R83 and R85 form a voltage divider which reduces the input to the amplifier to an appropriate level. The filtered supply voltage is fed to the ingrated circuit IC-2 by way of pin 14. The capacitor C35 is provided to eliminate high frequency oscillation. The capacitor C33, connected to pin 1, provides improved low frequency audio response and hum reduction. Pin 1 of the integrated circuit IC-2 is also connected to the collector of the transistor Q14, the circuit of which forms a speaker muting system to be described.

When the transistor Q14 is rendered non-conductive, the amplifier formed by the integrated circuit IC-2 operates normally. However, when the transistor Q14 is conductive, pin 1 of the integrated circuit IC-2 is short-circuited to ground, so that the operation of the integrated circuit IC-2 is paralyzed and the speaker is silenced. The emitter of the transistor Q14 is grounded, and its base is connected to the junction of a pair of 4.7 kilo-ohm resistors R70 and R71. The resistor R71 is grounded, and the resistor R70 is connected to contact A.0 of the switch section 14B. The base of the transistor Q14 is connected to contact P of switch section 14B. The resistor R17 provides thermal stability for the transistor Q14.

The transistor Q14 is rendered non-conductive, so as to permit operation of the speaker SP, only when the system is in the playback mode, in the T-2 message mode, or in the announce-only mode. In the playback mode, the base of the transistor Q14 is short-circuited directly to ground by the switch section 14B in its illustrated position, so that transistor Q14 is non-conductive. In the T-2 message recording mode, the transistor Q14 is also non-conductive because its drive is removed from both inputs to the "or" gate formed by resistor R70, and by a 3.3 kilo-ohm resistor R42. In the announce-only mode, the switch section 14B is shifted to the A.0 contact, which short-circuits the junction of resistors R66 and R70 to ground, rendering the transistor Q14 non-conductive, so as to permit speaker operation during the announce-only mode.

Therefore, as described above, muting is removed from the speaker circuit during the playback mode, so that the messages previously recorded on the message tape T-2 may be reproduced. Muting is also removed during the incoming message mode, so that the incoming messages may be monitored, if so desired; and in the announce-only mode, during which the speaker may be operated during the T-1 announcement interval for monitoring purposes, but is muted during the standby condition.

Otherwise, during the T-1 mode the speaker is muted, since the resistor R70 receives its input by way of a 4.7 kilo-ohm resistor R66 which is connected through the resistors R20, R19 and R14 to the collector of transistor Q1, which is at a relatively high voltage during the T-1 mode, when the switch CS1 is opened; and resistor R42 receives its input by way of relay contact K1A, which is connected through the winding of transformer T2, and the contacts K1B to the high voltage lead V+$_{cc}$ when the relay K1 is de-energized.

The audio switching circuit is composed of the diode D17 and D18, and associated control circuitry. The diode D18 is effective to permit the passage of audio intelligence from the output of the audio amplifier integrated circuit IC-1 to the telephone line; whereas the diode D17 is effective to permit the incoming messages from the telephone line to be fed to the audio amplifier integrated circuit IC-1 for amplification.

The audio switching control circuit includes an NPN transistor Q9 whose emitter is grounded, and whose collector is connected to a grounded 4.7 kilo-ohm resistor R44 and through a 3.3 kilo-ohm resistor R41 to the relay contacts K1A. The collector of transistor Q9 is also connected to the junction of resistors R50 and R74 through a 1 kilo-ohm resistor R46, and to a grounded 10 microfarad capacitor C12. The relay contacts K1A are also connected to a grounded 3.3 kilo-ohm resistor R11. The base of transistor Q9 is connected to resistor R20 through a 6.8 kilo-ohm resistor R52. The collector of the transistor Q9 is also connected to an 820 ohm resistor R45 which, in turn, is connected to the junction of capacitor C11 and the diodes D17 and D18. This junction is also connected to a 6.9 kilo-ohm resistor R43. The cathode of the diode D17 is connected through a 1.5 kilo-ohm resistor R47 and through a 1.5 kilo-ohm resistor R50 to the voltage lead V+. The junction of these two resistors is connected to the junction of a grounded 1.8 kilo-ohm resistor R49 and 3.3 kilo-ohm resistor R48. The resistor R49 is shunted by a 100 microfarad capacitor C13, and the resistor R48 is connected to the anode of the diode D18.

As mentioned above, during the T-1 announcement interval, the audio announcement on the T-1 tape, as amplified by the audio amplifier IC-1 is fed from the output of the amplifier to the telephone line through the diode D18. On the other hand, during the T-2 message recording mode, the message from the calling party is fed from the telephone line to the input of the audio amplifier integrated circuit IC-1 by way of the diode D17. The resistors R50 and R49 form a voltage divider network which supplies a voltage approximately midway between ground and the supply voltage V+ to the diodes D17 and D18. Capacitor C13 filters this voltage and provides a very low alternating current impedance feedback around the integrated circuit IC-1 by way of the resistors R47 and R48. The cathode of the diode D17 and the anode of the diode D18 are biased by the divided V+ voltage by way of the resistors R47 and R48 respectively. The anode of the diode D17 and the cathode of the diode D18 are both connected to the telephone line through the capacitor C11 and transformer T2.

When the transistor Q9 is non-conductive, filtered voltage is fed by way of the resistors R46 and R45 to the junction of the two diodes D17 and D18. When the transistor Q9 is non-conductive, the filtered voltage V+ is fed to the junction of the diodes D17 and D18 by way of the resistors R46 and R45. This voltage causes the diode D17 to be forward biased to its conductive state, and the diode D18 to be reversed biased to its non-conductive state, thus allowing the audio signals to be fed only from the telephone line to the input of the audio amplifier IC-1. This condition obtains during the T-2 message recording mode.

On the other hand, when the transistor Q9 is rendered conductive, the junction of the diodes D17 and D18 is short-circuited to ground by way of the resistor R45 and transistor Q9. This latter action causes the diode D18 to be forward biased to its conductive state, and the diode D17 to be reversed biased to its non-conductive state, thus allowing the audio signals to be fed only from the output of the audio amplifier integrated circuit IC-1 to the telephone line. The latter condition obtains during the T-1 announcement mode.

The capacitor C12 provides a very low alternating current impedance, such that the secondary of the transformer T2 always sees a constant 820 ohms (resistor R45) in parallel with the other resistance in the circuit. Resistor R44 provides thermal stability for the transistor Q9. The transistor Q9 receives its base drive from an "or" gate formed by the resistors R41 and R52. The resistor R41 receives its input by way of relay contacts K1A, transformer T2, and relay contacts K1B, when the relay K1 is de-energized. The resistor R52, on the other hand, receives its input from the collector of the transistor Q1 during the T-1 announcement interval.

In this way, the transistor Q9 is rendered non-conductive only when the relay K1 is energized, but there is no voltage at the collector of the transistor Q1, which occurs only during the incoming message record mode T-2. In all other modes, the audio switching network of transistor Q9 is held in the "outgoing" position to assure that no unwanted audio signals from the telephone line will enter the audio amplifier.

The circuit of the NPN transistor Q13 forms the "beep" oscillator such as described in copending application Ser. No. 556,649. The collector of the oscillator is connected through a 3.3 kilo-ohm resistor R65 and 1 kilo-ohm resistor R64 to the positive power lead V+$_{cc}$. The collector is also connected to the base through a pair of 47 kilo-ohm resistors R67 and R68. The emitter of the transistor Q13 is connected through a diode D19 to the collector of transistor Q9. The resistors R67 and R68 are shunted by a pair of 222 microfarad capacitors C17 and C18. The junction of the resistors R67 and R68 is connected to a 103 microfarad grounded capacitor C19, and the junction of the capacitors C17 and C18 is connected to a grounded 10 kilo-ohm resistor R69. The junction of resistors R67 and R65 is connected to a grounded 33 microfarad capacitor C16. The resistors R67, R68 and R69, together with the capacitors C17, C18 and C19 form a "bridged tee" feedback network which provides positive feedback at only one frequency from the collector to the base of the transistor Q13. With the aforesaid described parameters, this frequency is of the order of 1200 cycles.

The resistor R64 and capacitor C16 form a supply filter so that no ripple is present at the oscillator during the idle conditions. The resistor R65 is the collector load for the oscillator. The output is taken from the collector of the transistor Q13 and is fed by way of a 103 microfarad capacitor C28 and resistor R81 to the input of the audio amplifier integrated circuit IC-1. The output of the oscillator is amplified by the audio amplifier and fed to the telephone line at the conclusion of the T-1 announcement mode, and continues for a preset time of approximately one-half second. This is accomplished by using a Schmitt trigger circuit formed by a pair of transistors Q10 and Q11, and a timer circuit composed of a 47 microfarad capacitor C15 and a 58 kilo-ohm resistor R55.

The capacitor and resistor are both grounded, and connected to the junction of a pair of 10 kilo-ohm resistors R53 and R54. The resistor R54 is connected to the base of the transistor Q10, and the resistor R53 is connected to the junction of resistors R52 and R66. The emitter of the transistor Q10 is connected to the emitter of the transistor Q11, and to a common 56 ohm grounded resistor R58. The collectors of the transistors Q10 and Q11 are connected to the positive lead V+$_{cc}$ through resistors R56 and R61. The resistor R56 has a resistance of 1.5 kilo-ohms, and the resistor R61 has a resistance of 3.3 kilo-ohms. The collector of the transistor Q10 is connected to the base of transistor Q11 through a 4.7 kilo-ohm resistor R57, and the base of the latter transistor is connected to the emitters through a 4.7 kilo-ohm resistor R60. The junction of resistors R57 and R60 is connected to the junction of resistors R52 and R66 through a 4.7 kilo-ohm resistor R59. The collector of the transistor Q11 is connected through a 3.3 kilo-ohm resistor R62 to the base of a grounded emitter NPN transistor Q12. The base of the latter transistor is connected to a grounded 1 kilo-ohm resistor R63, and its collector is connected to the emitter of transistor Q13.

During the T-1 announcement mode, when the switch CS1 is open, a high voltage appears at the junction of resistor R53 and resistor R20, and the capacitor C15 is charged to render the transistor Q10 conductive. Transistor Q11 would normally be rendered non-conductive by this action, however, it continues to receive a base drive voltage by way of resistor R59 from the junction of resistors R20 and R33. Therefore, the transistor Q11 remains conductive for the duration of the announcement interval, and until the completion of the announcement interval when the switch CS1 closes to remove the voltage from the resistor R59. When that occurs, the transistor Q11 is immediately rendered non-conductive, thereby supplying a base drive voltage to the transistor Q12 by way of the resistors R61 and R62, so that the transistor Q12 is rendered conductive. When the transistor Q12 is conductive, it short-circuits the emitter of transistor Q13 to ground, allowing the beep tone oscillator to operate.

The diode D19 also provides a path from the collector of the transistor Q12 to the collector of the transistor Q9 to assure that the audio switching network will be held in the outgoing mode for the duration of the beep tone, so that the tone will be transmitted over the telephone line and heard by the calling party. When the charge on the capacitor C15 diminishes sufficiently, the transistor Q10 will be rendered non-conductive, thereby rendering the transistor Q11 conductive which, in turn, renders the transistor Q11 non-conductive and terminates the generation of the beep tone. The resistor R63 provides thermal stability for the transistor Q12.

Signals to be recorded on the T-2 tape and T-1 tape are fed to the switch section 14C from the output of the audio amplifier integrated circuit IC-1, and specifically to the common contacts of the switch section 14C. The switch section 14C selects the appropriate head RPH-1 or RPH-2 to which the recording signals will be fed for a given mode. In the playback, rewind, and announce-only modes, no recording is required, so that the output from the audio apmplifier integrated circuit IC-1 is short-circuited to ground for the P, R and A.0 positions of the swtich section 14C. In the Answer (A) and Record 2 (R-2) positions of switch section 14C, the recording signals from the audio amplifier integrated circuit IC-1 are fed to the record/playback head RPH-2. In the Record 1 (r-1) position of switch section 14C, the output signals from the audio amplifier integrated circuit IC-1 are fed to the record/playback head RPH-1.

The output signals for heads RPH-1, RPH-2 are taken from pin 8 of the integrated circuit IC-1 by way of the resistor R88. The resistance of resistor R88 and the impedance of the selected head reduce the audio signals to the required level. Direct current bias is received by way of the resistor R87. Bias current is taken from the base of the transistor Q17, and is further filtered by the resistor R86 and capacitor C34. The control of the signals to the heads RPH-2 and RPH-1 is effectuated through relay contacts K201A and K301A respectively which are operated by a remote control circuit, as will be described. During normal operation, the signals pass to the record/playback head through normally closed contacts K201A and K301A respectively.

The erase heads EH-1 and EH-2, which are respectively associated with the T-1 tape and T-2 tape are controlled by the switch sections 14A and 14B and remote control relay contact K301B and K201B. Supply voltage for the erase heads is provided by the resistor R30 from the V+$_{cc}$ line, and is filtered by the capacitor C1. Operation of the appropriate erase head is achieved by connecting the other terminal of the selected head to ground. Operation of the erase head EH-1 is required only during the Record 1 (R-1) mode, and for this mode, the terminal of the head EH-1 is grounded by way of the switch section 14A. Operation of the erase head EH-2 is required during the answer and Record 2 modes, and this action is achieved by the switch section 14B directly during the answer mode, and by way of diode D20 in the Record 2 (R-2) recording mode.

The contacts P and R-2 of switch section 14A are connected to an output terminal 1; the contact R of switch 14A is connected to an output terminal 2; the winding of transformer T2 is connected to an output terminal 3, and supplies audio signals from the telephone line to that terminal when the relay K1 is energized; the collector of transistor Q2 is connected to an output terminal 4. The output terminals 1, 2, 3 and 4 are connected to the T-1 remote control circuit of FIGS. 3A and 3B.

Figure 3A:
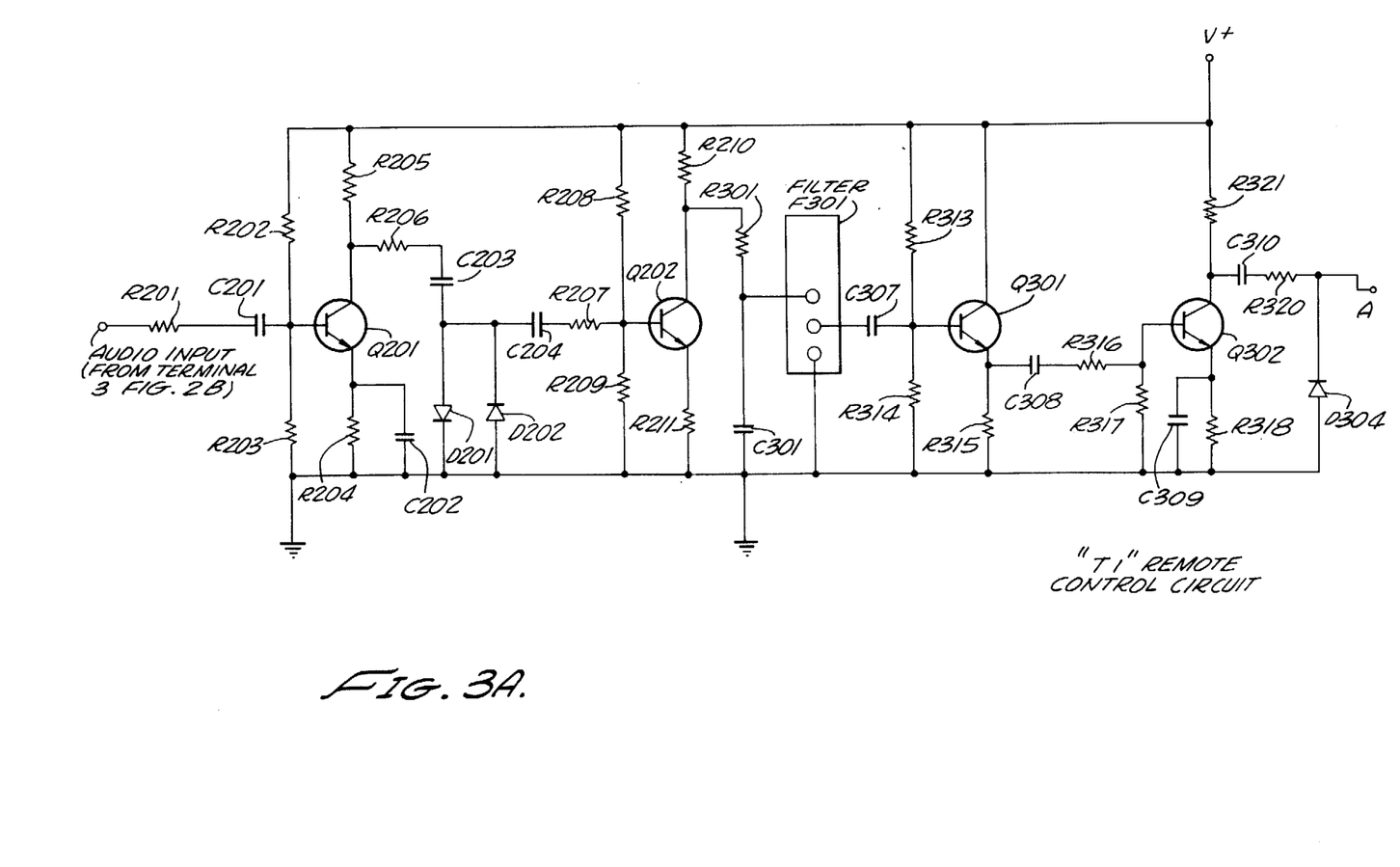
FIGS. 3A and 3B collectively represent a circuit diagram of the (T-1) remote control system of the invention in one of its embodiments.
Figure 3B:
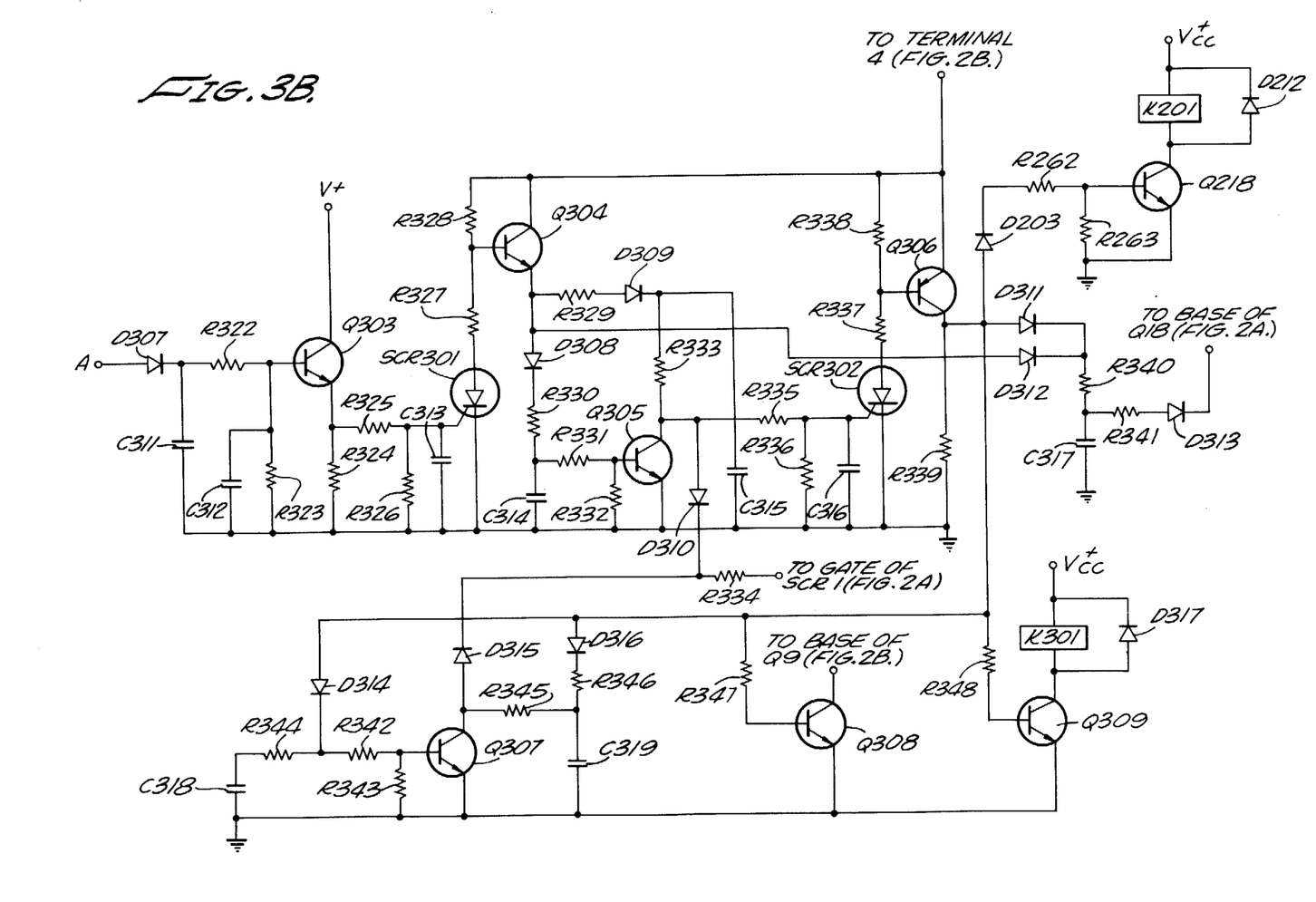

The T-1 remote control circuit responds to its particular tone to permit a new announcement to be recorded on the T-1 announcement tape.

In order to record the new announcement from the remote point, the user first calls up the instrument of the telephone line, and waits until he hears the announcement during the T-1 mode. He then sends the T-1 remote control tone over the telephone line by means of his portable tone generator. Nothing will happen immediately, and the instrument will complete the T-1 announcement mode. At the end of the T-1 announcement mode, he will hear the usual beep tone. He now transmits his message over the telephone line. However, instead of his message being recorded on the T-2 message tape, as it would be under normal operation of the instrument, his message will be recorded on the T-1 announcement tape, so as to replace the previous announcement recorded on the tape.

The user should time himself so that the length of his new announcement corresponds approximately to the loop capacity of the T-1 tape. At the end of the T-1 remote record cycle, the system will automatically switch the T-1 tape to its usual announce mode, so that the user can monitor the new announcement. Then, the system will switch to the normal T-2 message mode, at which time the user can hang up. The system is now set for normal operation with the new announcement.

Audio input for the T-1 remote control circuit of FIG. 3A is taken directly from the secondary winding of the transformer T2, and is applied from output terminal 3 of FIG. 2B to the input terminal 3 of FIG. 3A. The latter input terminal is connected through a 1 kilo-ohm resistor R201 and through a 10 microfarad capacitor C201 to the base of an NPN transistor Q201. The base is connected to the voltage lead V+ through a 56 kilo-ohm resistor R202 and to ground through a 22 kilo-ohm resistor R203. The emitter is connected to a grounded 1 kilo-ohm resistor R204 which is shunted by a 40 microfarad capacitor C202. The collector is connected to the V+ lead through a 3.3 kilo-ohm resistor R205, and is also connected to a 1 kilo-ohm resistor R206.

The resistor R206 is connected to a 10 microfarad capacitor C203 which, in turn, is connected to the anode of a diode D201, to the cathode of a diode D202 and to a 10 microfarad capacitor C204. The cathode of diode D201, and the anode of diode D202 are grounded. The capacitor C204 is connected through a 1 kilo-ohm resistor R207 to the base of a transistor Q202. The base of transistor Q202 is connected through a 150 kilo-ohm resistor R208 to the V+ lead, and the base is also connected to a grounded 10 kilo-ohm resistor R205. The emitter of transistor Q202 is connected to a 100 ohm grounded resistor R211, and its collector is connected to a 3.3 kilo-ohm resistor R210 and to a 100 kilo-ohm resistor R301. The resistor R210 is connected to the positive lead V+, whereas the resistor R301 is connected to a filter circuit F301 and to a grounded 0.0047 microfarad capacitor C301. A further terminal of filter circuit F301 is grounded, and its output terminal is connected to a 10 microfarad coupling capacitor C307.

The T-1 tone from the caller is received on terminal 3 of the circuit of FIG. 3A, and it is amplified in the audio preamplifier circuit of transistor Q201, clipped by the circuit of diode D201 and D202, and again amplified by the audio circuit of the transistor Q202. The amplified signal at the point is a square wave of approximately 1-volt amplitude. The output of the audio amplifier of the transistor Q202 is introduced through the resistor R301 to filter F301 which selects the T-1 tone.

The output terminal of the filter F301 is connected to a 10 microfarad coupling capacitor C307. The capacitor C307 is connected to the base of a transistor Q301, the base being connected to the junction of a 1 megohm grounded resistor R314 and a 220 kilo-ohm resistor R313. The latter resistor, and the collector of the transistor Q301, are connected to the positive potential lead V+. The emitter of the transistor Q301 is connected to a grounded 10 kilo-ohm resistor R315. The emitter of transistor Q301 is also connected to a 10 microfarad capacitor C308 which, in turn, is connected through a 1 kilo-ohm resistor R316 to the base of a transistor Q302, the base being connected to a grounded 10 kilo-ohm resistor R317.

The emitter of the transistor Q302 is connected to a grounded 100 ohm resistor R318 and to a grounded 47 microfarad capacitor C309. The collector of the transistor Q302 is connected to the positive lead V+ through a 1.5 kilo-ohm resistor R321. The collector is also connected to a 10 microfarad capacitor C310 which, in turn, is connected through a 1 kilo-ohm resistor R320 to the anode of a diode D307 (FIG. 3b).

The anode of diode D307 is also connected to the cathode of a diode D304, the anode of which is grounded. The cathode of diode D307 is connected through a 10 kilo-ohm resistor R322 to the base of a transistor Q303, the collector of which is connected to the positive lead V+. The emitter of transistor Q303 is connected to a grounded 2.2 kilo-ohm resistor R324, and its base is connected to a grounded 100 kilo-ohm resistor R323 which is shunted by a 100 microfarad capacitor C312. The emitter of the transistor Q325 is connected through a 4.7 kilo-ohm resistor R325 to the gate of a silicon controlled rectifier SCR301. The gate is also connected to a grounded 1 kilo-ohm resistor R326 which is shunted by a 47 microfarad capacitor C313.

The circuit of transistor Q301 is an emitter follower which serves to isolate the output of the filler F301, and the output of the emitter follower is fed to a rectifier driver circuit formed by the transistor Q302 and its associated components. The output of the rectifier driver is fed to the diodes D304 and D307 which rectify the audio signal. This rectified voltage is used to charge the capacitor C311 through the resistor R321, the time constant being approximately one-half second. When the capacitor C311 is charged sufficiently, the transistor Q303 will be rendered conductive to fire the silicon controlled rectifier SCR301.

The circuit of the transistor Q303 operates, therefore, as a timer, and causes the silicon controlled rectifier SCR301 to be triggered a predetermined time interval after the initial receipt of the T-1 tone. The cathode of the silicon controlled rectifier SCR301 is grounded, and its anode is connected through a 1 kilo-ohm resistor R327, and through a 330 ohm resistor R328 to the terminal 4 of the circuit of FIG. 2B, which terminal receives a positive voltage during the T-1 mode, as explained above.

A transistor Q304 has its base connected to the junction of the resistors R327 and R328, its emitter connected to the terminal 4, and its collector connected to a 1 kilo-ohm resistor R329 and to the anode of a diode D308. The cathode of the diode is connected through a 470 ohm resistor R330 to a 4.7 microfarad grounded capacitor C314. The junction of resistor R330 and capacitor C314 is connected through a 10 kilo-ohm resistor R331 to the base of a grounded emitter NPN transistor Q305. The base is connected to a 4.7 kilo-ohm resistor R332, and the collector is connected through a 10 kilo-ohm resistor R333 to the cathode of a diode D309, the anode of which is connected to resistor R329.

The collector of the transistor Q305 is connected through a diode D310 and through a 10 kilo-ohm resistor R334 to the gate of the silicon controlled rectifier SCR1 in the circuit of FIG. 2A. The junction of diode D390 and resistor R333 is connected to a grounded 16 microfarad capacitor C315. The collector of transistor Q305 is also connected through a 10 kilo-ohm resistor R335 to the gate of a silicon controlled rectifier SCR302. This latter gate is connected to a grounded 10 kilo-ohm resistor R336 and to a grounded 1 microfarad capacitor C316. The cathode of the silicon controlled rectifier SCR302 is grounded, and its anode is connected through a 1 kilo-ohm resistor R337 and through a 330 ohm resistor R338 to the voltage supply terminal 4 of the circuit of FIG. 2. A transistor Q306 has its base connected to the junction of the resistors R337 and R338, its emitter being connected to the terminal 4, and its collector connected to a 1 kilo-ohm grounded resistor R339.

The collector of the transistor Q304 and the collector of the transistor Q306 are connected through respective diodes D311 and D312 to a 470 ohm resistor R340. The resistor is connected to a grounded 100 microfarad capacitor C317 and to a 4.7 kilo-ohm resistor R341. The latter resistor is connected through a diode D313 to the base of the transistor Q18 in FIG. 2A. The diodes D311 and D312 function as an "or" gate, and the purpose of the latter circuit is to hold the transistor Q18 conductive, so that the relay K1 will be maintained energized for the duration of the T-1 remote cycle, even though the equipment had been set to the announce mode, and would otherwise hang up after the first T-1 cycle.

The collector of transistor Q306 is connected through a diode D314 which, in turn, is connected through a 10 kilo-ohm resistor R342 to the base of a grounded emitter NPN transistor Q307. The base is also connected to a 4.7 kilo-ohm grounded resistor R343. A 470 ohm resistor R344 and a 47 microfarad capacitor C318 are connected in series between the cathode of diode D314 and ground. The collector of transistor Q307 is connected through a diode D315 to the resistor R344, so that when the second silicon controlled rectifier SCR302 is fired, the silicon controlled rectifier SCR1 may be triggered to re-initiate the T-1 cycle. The collector of the transistor Q307 is also connected to a 22 kilo-ohm resistor R345 which, in turn, is connected to a 1 kilo-ohm resistor R346 and to a grounded 220 microfarad capacitor C319. The resistor R346 is connected to a diode D316 which in turn is connected back to the collector of transistor Q306.

The collector of transistor Q306 is also connected through a 2.2 kilo-ohm resistor R347 to the base of a grounded emitter NPN transistor Q308. The collector of transistor Q308 is connected to the base of the transistor Q9 of FIG. 2B, so as to render that transistor conductive, and set the circuit of FIGS. 2A and 2B to the incoming audio mode, so that the new announcement received from the calling party may be recorded on the tape.

The collector of the transistor Q306 is also connected through a 2.2 kilo-ohm resistor R348 to the base of a grounded emitter transistor Q309. The collector of the transistor Q309 is connected through the coil of a relay K301 to the positive potential lead V+$_{cc}$. The relay is shunted by a diode D317 which protects the transistor Q309 from transients appearing across the coil of relay K301. This causes the relay K301 to be energized during the first T-1 cycle, so that the relay contacts K301B in FIG. 2A may energize the erase head EH-1, regardless of the setting of the selector switch 14, and so that the record/playback head RPH-1 associated with the T-1 announcement tape may be connected to the output of the amplifier IC-1 to record the new incoming announcement.

The collector of transistor Q306 is also connected through diode D213, and through resistor R262, in the circuit of FIG. 3B to the base of transistor Q218, so that the relay k201 may also be energized during the T-1 remote record operation. The purpose of this is to switch out the EH-2 erase head of FIG. 2A during the record cycle by activating the relay contacts K201B, so that it will not appear in parallel with the EH-1 record head, which would otherwise adversely affect the DC biasing circuit in the system of FIGS. 2A and 2B.

In the operation of the T-1 remote control circuit of FIGS. 3A and 3B, audio input from the telephone line is received at terminal 3 of FIG. 3A and is amplified by transistor Q201. The diodes D201 and D202 act as clippers for the output of transistor Q201, and the resulting clipped wave form is further amplified by the driver transistor Q202, and fed to the input of filter F301. The filter F301 is a narrow pass band filter and it passes only the T-1 remote tone. The output of filter F301 is buffered by the transistor Q301 and fed to the input of rectifier driver transistor Q302. The T-1 tone, when present is rectified by the diodes D304, D307, and the resulting direct current voltage is used to charge capacitor C312 (FIG. 3B) through resistor R322.

The voltage across the capacitor C312 is buffered by transistor Q303 and the resulting output is used to drive the gate of SCR301. When the T-1 tone has been present continually for approximately ½ second, a time constant established by resistor R322 and capacitor C312, the gate will be driven into conduction and SCR301 will fire. SCR301 and transistor Q304 will now be latched in the conductive condition.

Terminal 4 of FIG. 3B receives its voltage from the T-1 voltage of the system of FIGS. 2A and 2B, which exists only during the T-1 cycle. Thus operation of the T-1 remote control circuit of FIGS. 3A and 3B occurs only during the T-1 cycle and all operation of the circuit ends at the end of the T-1 cycle.

The voltage present at the collector of transistor Q304 after the SCR301 has been fired is used to accomplish three purposes:

First, the capacitor C317 is charged through diode D312, and the resulting voltage across the capacitor is fed to the base of transistor Q18 in the system of FIG. 2A to hold the telephone line connected to the system during the brief interruption to the T-1 cycle should the remote T-1 control signal be received when the system is in its "announce" mode.

Second, the capacitor C315 is charged through the diode D309, and the resulting charge across the capacitor is used to retrigger SCR1 in the system of FIG. 2A by way of resistor R333, diode D310 and resistor R334;

and also to trigger SCR302 through resistors R333 and R335.

However, the aforesaid triggering and trigering action is inhibited by the transistor Q305 which is rendered conductive as a third purpose by the voltage at the collector of transistor Q304, through diode D308, resistor R330 and resistor R331. The transistor Q305 must be rendered non-conductive before the retriggering of SCR1 and the triggering of SCR302 can occur.

Therefore, even after the receipt of the T-1 remote control tone, the system continues in its T-1 mode until the end of the cycle. It then transmits the beep tone to the calling party to permit him to record the new announcement.

The T-1 voltage disappears from the terminal 4 of the circuit of FIG. 3B at the end of the T-1 cycle, allowing SCR301 and, therefore, transistor Q304 to become non-conductive. This removes the charging voltage from the capacitor C314 and, after approximately ½ second to allow for the beep tone to be transmitted to the calling party, transistor Q305 becomes non-conductive to remove the inhibit and to permit the residual charge of capacitor C305 to retrigger SCR1 and to trigger SCR302.

As soon as SCR1 is retriggered the T-1 voltage again appears at terminal 4 in FIG. 3B allowing SCR302 to be fired and latched in its conductive state, with transistor Q306 also being rendered and held conductive. The resulting voltage at the collector of transistor Q306 performs the following functions:

First, the capacitor C317 is charged through diode D311 and resistor R340, and the voltage across the capacitor is fed to the base of transistor Q18, as before, to hold the telephone line connected to the system should the system be in the announce mode.

Second, the transistor Q309 is rendered conductive to energize relay K301 to permit the new announcement received on the telephone line to be recorded on the T-1 tape. When relay K301 is energized the EH-1 erase head (FIG. 2A) is activated and the RPH-1 (FIG. 2B) is switched to the output of the audio amplifier. Relay K201 is also energized by way of transistor Q218 (FIG. 3B) to remove the load of the head RPH-2 (FIG. 2B) which would otherwise be in parallel with the head RPH-1.

Third, the transistor Q308 (FIG. 3B) is rendered conductive to ground the base of transistor Q9 (FIG. 2B). This switches the telephone line audio switching network into the incoming mode so that the new announcement received from the remote caller over the telephone line may be amplified, fed to the head RPH-1 and recorded thereby on the T-1 tape.

Fourth, capacitor C319 (FIG. 3B) is charged by way of diode D316 and resistor R346, and this charge is used to retrigger the gate of SCR1 in the circuit of FIG. 2A through resistor R345, diode D315 and resistor R334. Also, capacitor C318 is charged through resistor R344 to trigger SCR302. However, this triggering of SCR302 and retriggering of the SCR1 is inhibited by the fact that the transistor Q307 is now biased to a conductive state through diode D314 and resistor R342.

At the end of the T-1 cycle, the new announcement will have been recorded on the T-1 tape, and the T-1 mode will end in the usual manner and the T-1 voltage will disappear from terminal 4 of FIG. 3B. With no T-1 voltage at terminal 4, SCR302 and therefore transistor Q306 will revert to their non-conductive state. During this transition interval the system of FIGS. 2A and 2B transmits the beep tone to the calling party. After about ½ second, capacitor C318 will discharge to a point at which transistor Q307 becomes conductive and no longer performs its inhibit function. The residual charge on capacitor C319 now retriggers SCR1 in FIG. 2A to institute a "confirm" T-1 cycle during which the new announcement is sent in normal manner to the calling party, as if he had just placed the call. If the new announcement is correct the calling party may hang up, if it is not correct he can re-institute the operation described above and record the announcement again on the T-1 tape.

The invention provides, therefore, an improved telephone answering system which is constructed to utilize solid state elements, and which involves a minimum of moving parts. The system described is rugged and reliable in its operation, and is capable of a remote control with respect to recording new announcements on the T-1 announcement tape.

It will be appreciated that although a particular embodiment of the invention has been shown and described, modifications may be made. It is intended in the claims to cover the modifications which come within the true spirit and scope of the invention.

What is claimed is:

1. In a telephone answering system which responds to a ring signal received over a telephone line to transmit a recorded announcement over the telephone line to a calling party, in which the recorded announcement is recorded on a loop magnetic member having electro-magnetic transducing means magnetically coupled thereto for recording announcements in the magnetic member and for playing back announcements previously recorded on the magnetic member, switching means controlled by said magnetic member to be actuated to a particular state when the magnetic member is moved from a reference position and to remain actuated in said particular state for the duration of a T-1 operating cycle and until the magnetic member returns to the reference position, and which includes a drive system for controlling the movement of the magnetic member, and audio amplifying circuit means; the combination of: a switching circuit for selectively connecting said audio amplifying circuit means to the telephone line and to the transducing means to cause the announcement recorded on the magnetic member to be transmitted over the telephone line in one operating condition of the switching circuit and to cause a new announcement from the telephone line to be recorded on the magnetic member in a second operating condition of the switching circuit; a tone sensing circuit coupled to the telephone line for sensing a tone signal of a predetermined frequency received over the telephone line and for providing a control signal in response thereto; a first control circuit coupled to said tone sensing circuit and to said switching means and responsive to said control signal to switch said switching circuit from said first condition to said second condition only while said switching means is actuated to said particular state during said T-1 operating cycle; and an inhibit control circuit interposed between said first control circuit and said switching circuit to prevent switching of said switching circuit to said second condition until the completion of a first T-1 operating cycle.

2. The combination defined in claim 1, and which includes a further control circuit coupled to said first control circuit and to said inhibit control circuit to remove the inhibit at the end of said first T-1 operating cycle and to activate said drive system to move said magnetic member from said reference position so as to actuate said switching means to said particular state thereby to institute a second T-1 operating cycle during which said switching circuit is switched to said second condition for the duration of said second T-1 operating cycle.

3. The combination defined in claim 2, and which includes oscillator circuit means connected to said switching means for generating a beep tone for a predetermined interval each time said magnetic member reaches said reference position; and circuit means for applying said beep tone to the telephone line.

4. The combination defined in claim 3, and which includes delay circuit means connected to said last-named circuit means for delaying the activation of said further control circuit means for a predetermined interval after the magnetic member has returned to said reference position at the termination of the first T-1 operating cycle.

* * * * *